United States Patent [19]
Campbell

[11] 3,826,164
[45] July 30, 1974

[54] PANEL CUTTING METHOD AND APPARATUS

[75] Inventor: James W. Campbell, Fort Worth, Tex.

[73] Assignee: Wetoma Corporation, Ft. Worth, Tex.

[22] Filed: Nov. 15, 1972

[21] Appl. No.: 306,935

[52] U.S. Cl............ 83/23, 83/29, 83/256, 83/272, 144/242 R, 144/326
[51] Int. Cl............................................. B26d 7/06
[58] Field of Search............ 144/326, 242 R, 242 D, 144/312; 83/404.1, 277, 404.2, 23, 29, 256, 272, 110, 788

[56] References Cited
UNITED STATES PATENTS

| | | | |
|---|---|---|---|
| 3,264,917 | 8/1966 | Califano et al.................. | 83/408 X |
| 3,522,829 | 8/1970 | Wehner............................ | 83/110 X |
| 3,566,729 | 3/1971 | Menn................................ | 83/272 X |
| 3,662,798 | 5/1972 | Campbell........................ | 144/326 R |
| 3,768,352 | 10/1973 | Campbell.......................... | 83/104 |
| 3,788,174 | 1/1974 | Morse et al..................... | 83/404.2 X |

Primary Examiner—Andrew R. Juhasz
Assistant Examiner—W. D. Bray
Attorney, Agent, or Firm—Kinzer, Plyer, Dorn & McEachran

[57] ABSTRACT

This is a method and apparatus for cutting accurately sized panels, for example, from sheets of particleboard, hardboard, fiberboard, plywood, plastics and other panel material, to be used in furniture making, home building, cabinets, etc. The method and apparatus are concerned with improving the speed and efficiency of existing machines and include what is referred to as cascade gauging on a machine with either one or two axis of movement.

25 Claims, 17 Drawing Figures

PANEL CUTTING METHOD AND APPARATUS

SUMMARY OF THE INVENTION

This invention is concerned with a cutting and sizing machine and system for accurately forming large panels into smaller, accurately dimensioned panels for use in furniture building, home building, TV cabinets, etc.

A primary object of the invention is a method and apparatus which uses cascade gauging. Another object is a panel sizing machine and system which produces a minimum of waste.

Another object is a panel sizing system which may be fully automatic.

Another object is a cascade gauging system wich may be used on either a single or a two-axis machine.

Another object is a gauging system which automatically ejects the previously cut panels at the start of the next sizing and cutting cycle.

Another object is a panel sizing system which provides for and includes both forward and rearward feeding of the panels or stack strips in a certain sequence to provide certain results.

Another object is a cascade gauging system which maintains a uniform wear pattern in the gauging mechanism.

Another object is a gauging system that prevents or minimizes any skewing in the strip stacks being fed to the saw.

Another object is a gauging and feeding system which insures that all of the strip stacks accurately arrive at the saw line.

Another object is a cascade gauging system that moves certain strip stacks and not others in a step-by-step fashion to a saw line.

Another object is a method and apparatus for effecting a differential feed of a plurality of strip stacks to a saw line.

Another object is a method and apparatus that prevents roughing or chafing of a previously cut strip stack which is not moved during the next feeding and gauging step.

Another object is a method and apparatus for differentially feeding and gauging a plurality of strip stacks which fully compensates for or eliminates any backlash problems in the drive train.

Another object is a method and apparatus for ejecting the previously cut panels from a first group with the strip stack of the second group without disruptive impact between groups.

Another object is a two-axis panel sizing system that uses differential movement of the strip stacks on the X axis.

Another object is a sizing system which permits simultaneous cutting of complex patterns in a single passing through the system.

Other objects will appear from time to time in the ensuing specification and drawings.

DESCRIPTION OF THE PREFERRED EMBODIMENT

Figure 1:
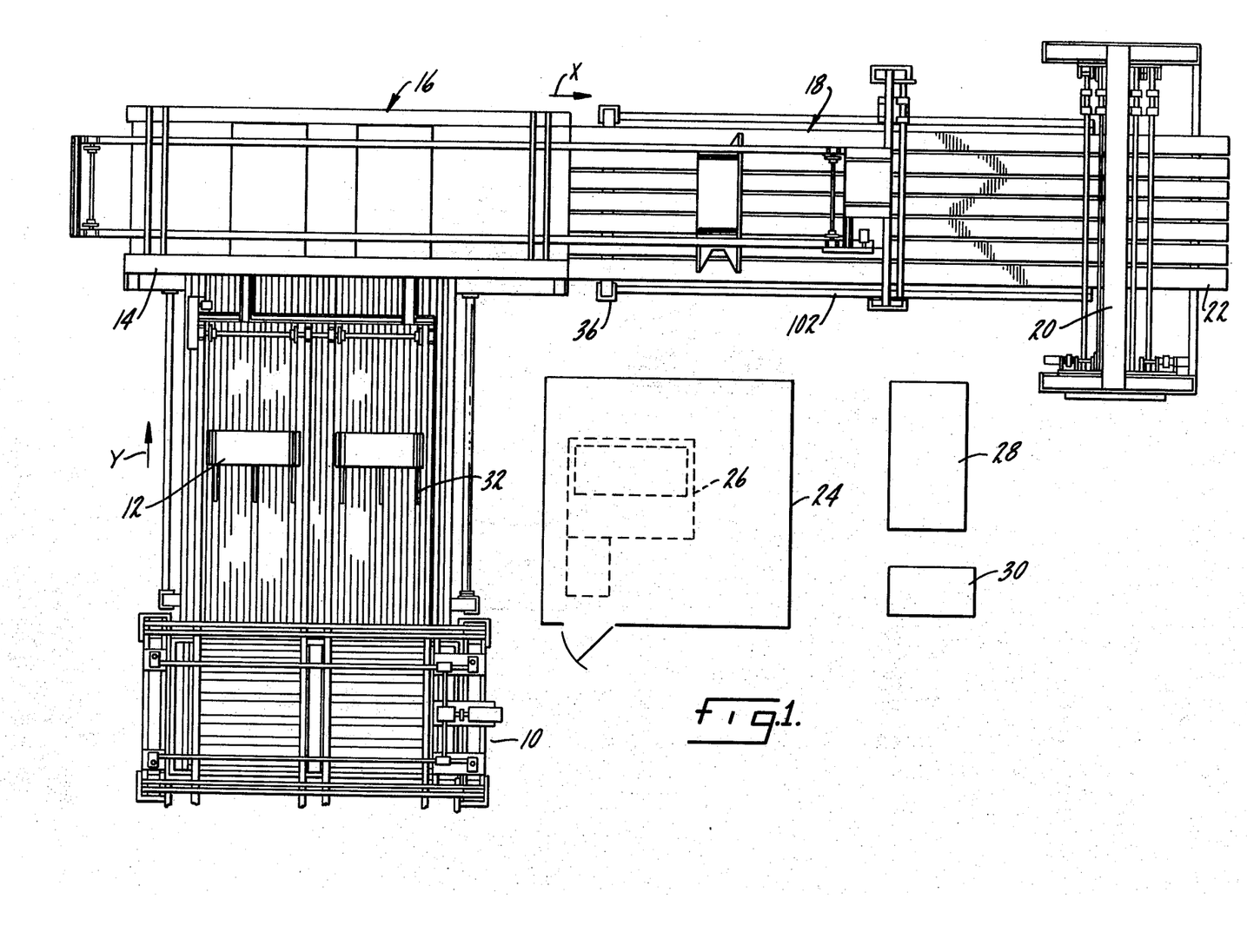
FIG. 1 is a top plan view of the unit.
Figure 2:
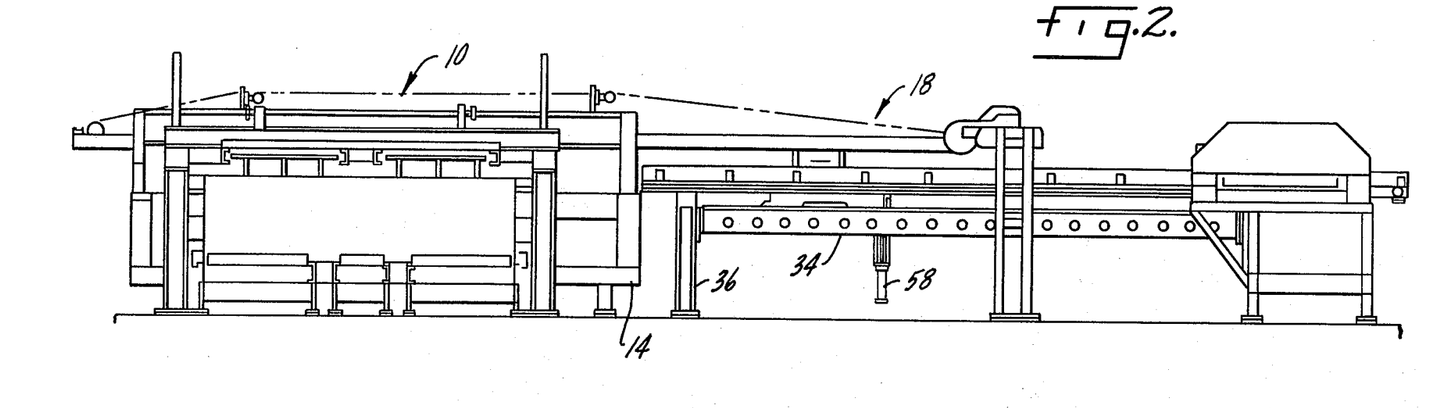
FIG. 2 is a front view of FIG. 1.

A machine and system for sizing large boards into small, accurately dimensioned panels is shown generally in FIGS. 1 and 2. The unit has two axis at right angles to each other, indicated by the arrows X and Y in FIG. 1. On a broad basis, the machine includes a stack end feed section 10, a first gauging unit 12, a first saw unit 14, a transfer unit 16, a second gauging unit 18, a second saw unit 20, and a discharge unit 22. An elevated operator's platform may be provided at 24, enclosing and including an electronic control 26 with a hydraulic power unit 28 and oil cooler 30 adjacent thereto. The general arrangement is similar to what is shown in my previously issued U.S. Pat. No. 3,662,798, issued May 16, 1972, and reference is made thereto for details. Stocks of sheet material, be they particleboard, hardboard, plywood or what have you, are first placed on a charging roll unit, not shown herein, which delivers the sheets to the stack end feed section 10 where the sheets are counted and moved on to the gauging unit 12 in stacks of a predetermined number of sheets. On the gauging unit 12, clamp bars, indicated generally at 32, and shown in detail in my prior patent, grip the gear marginal edges of the stack to securely hold the sheets together and the stack is then indexed to the first saw unit or cutting station 14 in steps through predetermined distances according to the pattern to be cut. The caliper clamps or clamp arms establish a reference line in respect to the saw unit so that before each cut the clamps and reference line are advanced a predetermined distance. This position the stack so that the saw unit will then cut off strips of the stack of panels either of the same or varying widths which are equal to the predetermined distances of the feeding steps. The clamps are of the caliper typed adapted to float on their supporting carriage unit so that the clamp and carriage weight is not added to the panel stack. Automatic hold down units may be provided on each side of the saw line 14 to press the stack against the gauge table as the saw, moving from underneath, makes it cut through the material. The hold downs are preferably hydraulically operated and may be of any suitable construction. The strip stacks formed on the Y axis will be moved or pushed on to the transfer unit 16 with their long dimension disposed laterally to the Y axis and parallel to the X axis. The initial large boards brought into the charging roll unit and end feed unit 10 might be, for example 8 ½ feet by 42 feet, and would be exposed with their long dimension, 42 feet, in the example given above, disposed across or lateral to the Y axis. Thus, the strip stacks produced at the first saw line and pushed forward on to the transfer unit would be elongated in the direction of the X axis. In the present unit it is contemplated that the first saw 14 would take a trim cut off of the front edge of the stack, cut the panel stack thereafter into various width of stack, a foot or so each, and then a trim cut along the rear edge. In the example given above, of an 8 ½ by 42 foot board, this might produce three, four or five 42 foot stack strips, all of which would be positioned side by side on the transfer unit 16 with their elongated dimension in the direction on the X axis. Transfer unit 16 would then move them together on the X axis gauge table 18 by a suitable conveyor or transfer means and thereafter advanced by the X axis gauging unit, in a manner to be explained hereinafter, to the X axis saw 20 where they are cut into various size panel stacks.

Figure 3:
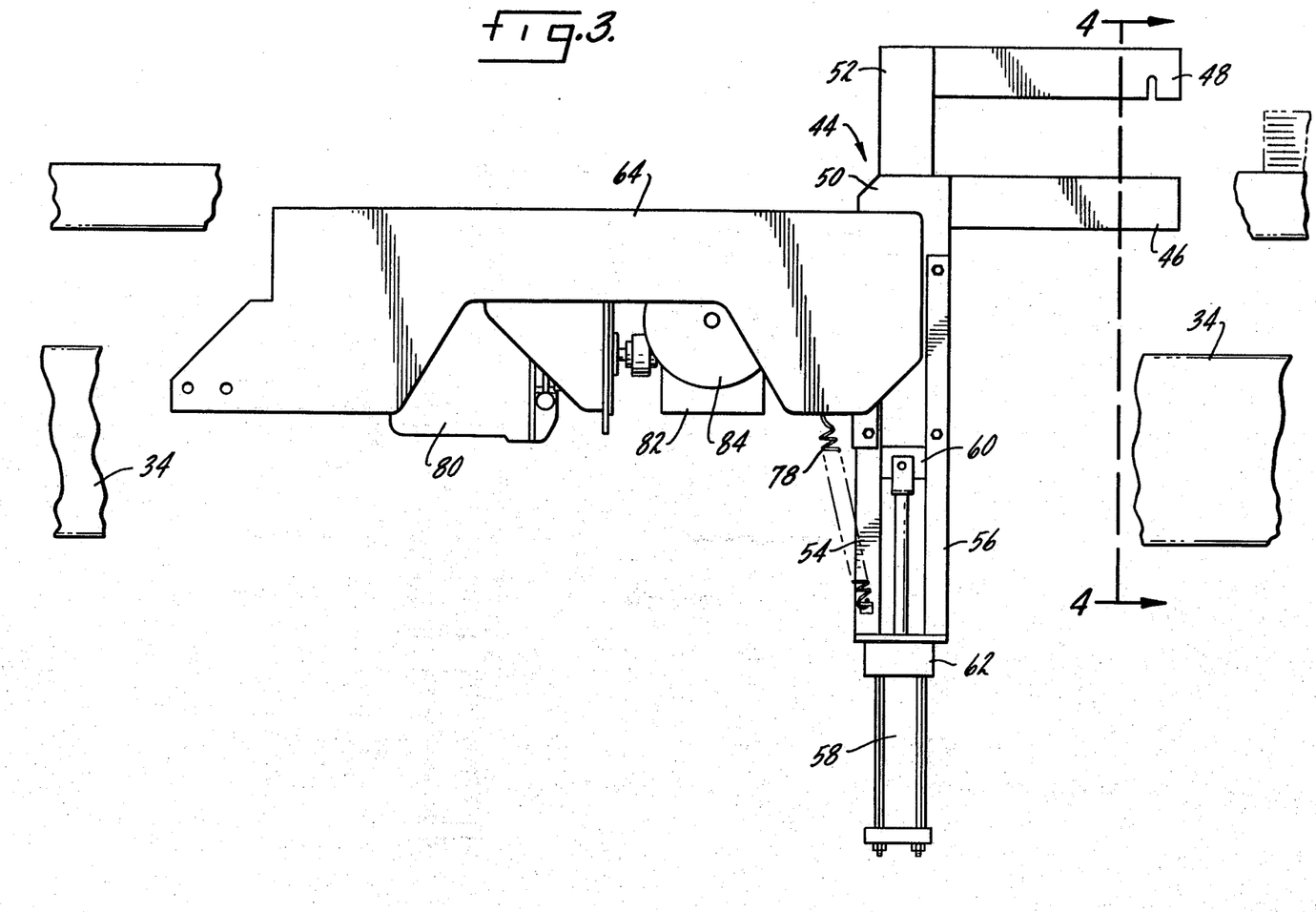
FIG. 3 is an enlargement of a portion of FIG. 2, with parts removed for clarity, showing one of the caliper clamps.
Figure 4:
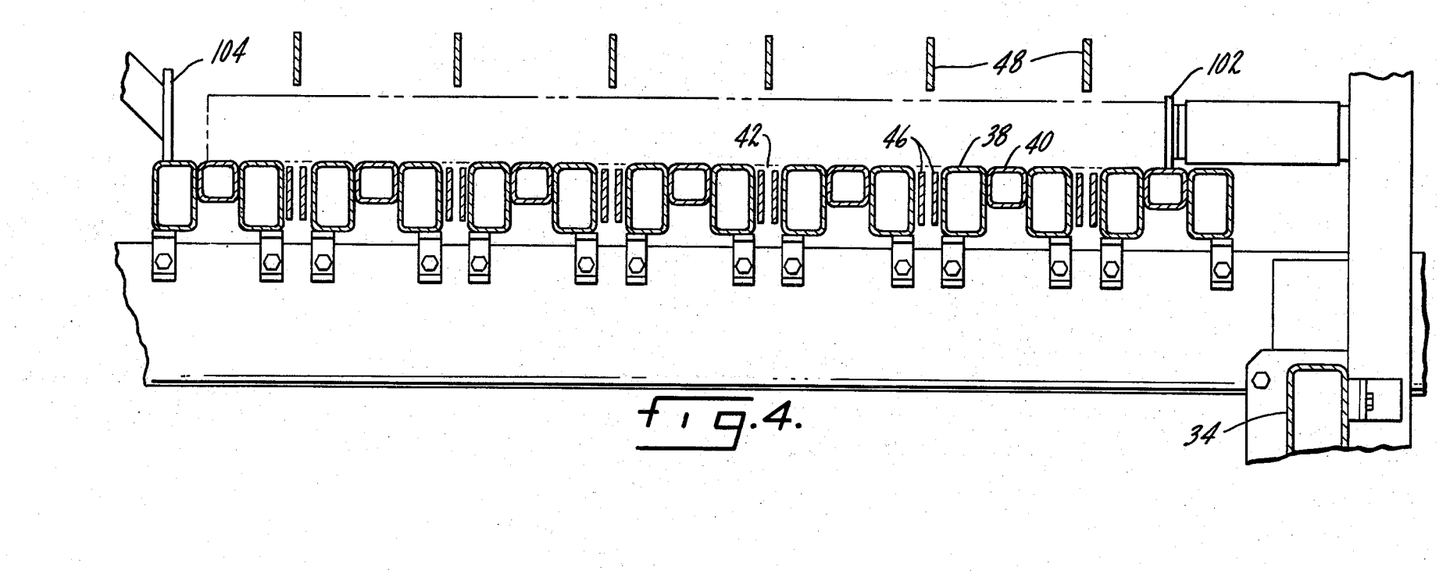
FIG. 4 is a section along line 4—4 of FIG. 3.
Figure 5:
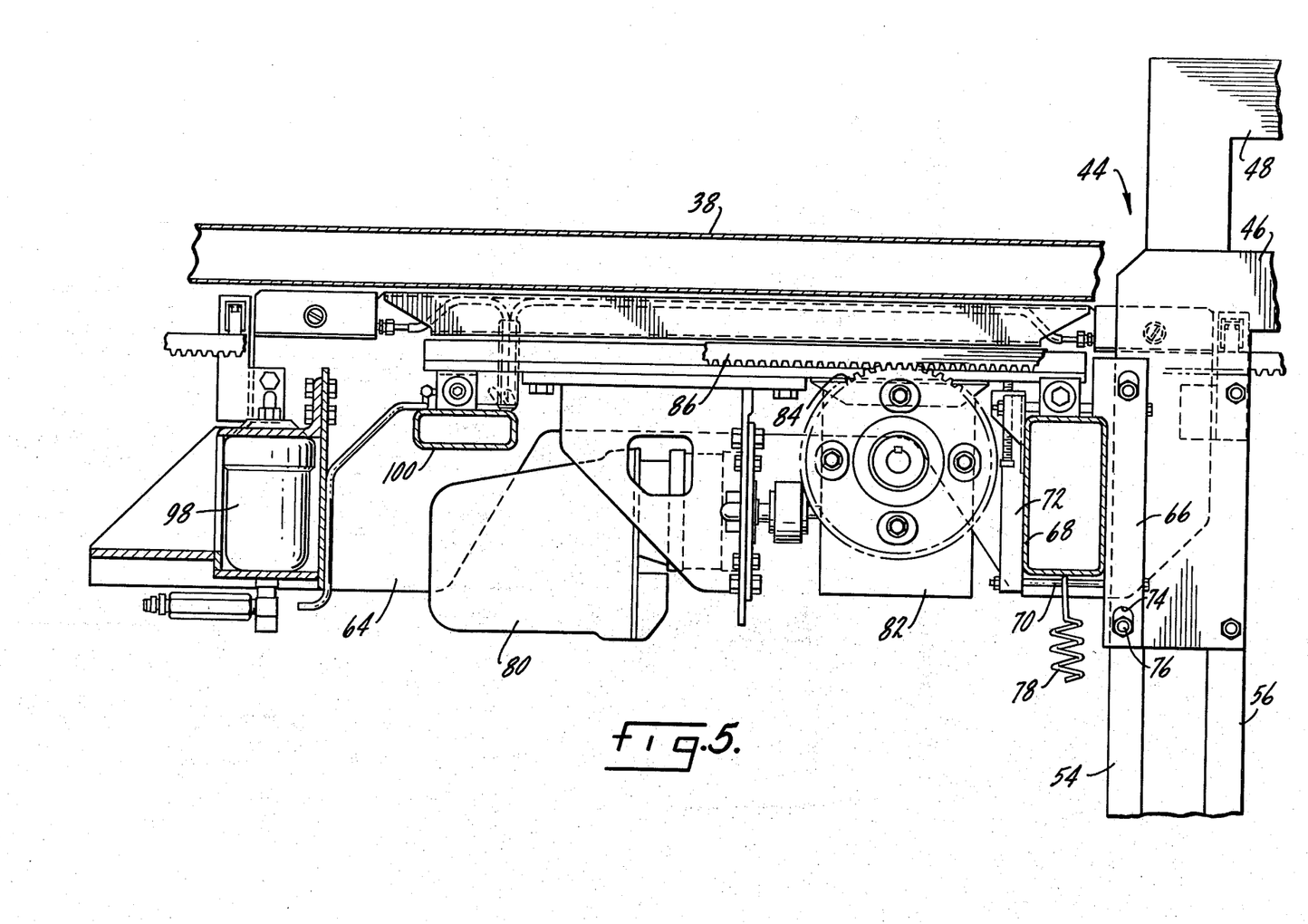
FIG. 5 is an enlargement of FIG. 3, partly in section, and with parts removed for clarity.
Figure 6:
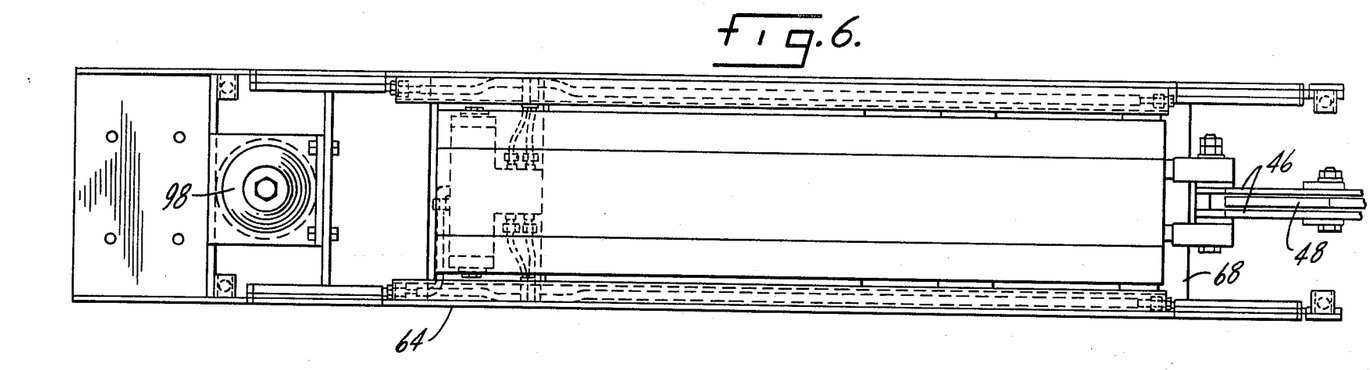
FIG. 6 is a top view of FIG. 5.
Figure 7:
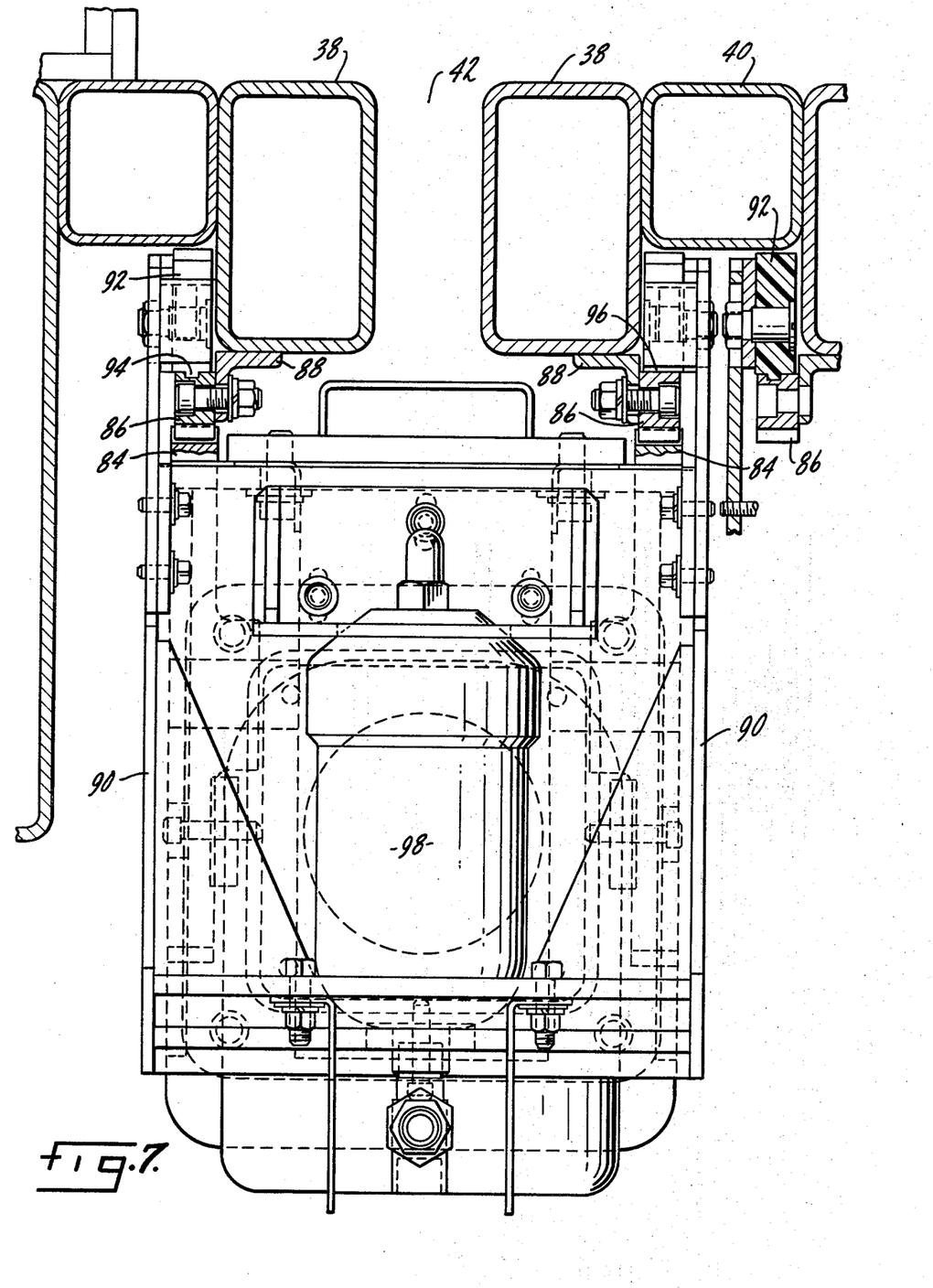
FIG. 7 is an end view, from the left in FIG. 5, on an enlarged scale.

As shown in detail in FIGS. 3 through 7, the gauging unit 18 on the X axis includes a gauging table 34 basically made up of a plurality of legs or uprights 36 which support a plurality of longitudinally disposed beams or tubes 38 which, as shown in FIG. 4, are more or less uniformly spaced from each other across the table with interconnecting somewhat smaller tubes or beams 40 in every other space so that the upper surface of the table would present a continuous, unbroken appearance except for longitudinal openings or spaces 42 more or less uniformly spaced across the table which accept the caliper clamps 44, one of which is shown in detail in FIGS. 3, 5 and 7 and six of which are used and shown herein, although it could be more or less. The caliper clamps individually are quite similar to the one shown and described in my issued U.S. Pat. No. 3,662,798, but instead of all of the caliper clamps being mounted on the same carriage on the X axis so that they move in unison, each clamp is mounted on a separate carriage so that it may be operated independently of all the others. Each gauge clamp may include a caliper type clamp arrangement having a pair of laterally spaced lower jaws 46 and a single upper jaw 48 vertically movable between its lowered, nesting position between the lower jaws and its upper, extended position, as shown in FIG. 3. Lower jaws 46 each have a rearward support or extension 50. The upper jaw has a rearward support or extension 52 mounted for vertical sliding movement between the supports 50 by means of a pair of mutually facing channels 54 and 56. Vertical movement of the upper jaw 48 is effected through an actuator 58 which may be air operated, hydraulic or otherwise with its piston rod connected, as at 60, to the lower end of the upper jaw extension and with the cylinder suitably mounted as at 62 to the lower end of the channels.

Each gauging clamp is mounted on its carriage 64 through a sliding connection, shown in FIG. 5, which includes a pair of brackets 66, one on each side of the carriage secured to a cross tube or channel 68 by suitable means such as bolts 70 and brackets 72. Slots 74 are formed in the brackets 66 and the clamps are sliderly mounted within these slots on bolts 76. Springs 78 are connected at one end to the support and at their other end to the carriage support to urge the gauge clamp upwardly in the slots with respect to the carriage and to thereby support at least a part of the weight of the clamp and actuator. The gauge carriage is driven along the rails by means of a conventional hydraulic servo-type motor 80 to provide accurate positioning of the carriage. The motor is connected into a gear box 82 in a conventional manner with drive pinions 84 on each side thereof, each of which engages a downwardly facing rack 86 which is mounted on the bottom of the channels or tubes 38 by brackets 88. Side plates 90 on the carriage extend up on each side and carry a sliding bearing block 92 which is keyed on one side, as at 94, to the upper surface of the rack and in plane sliding contact 96 on the other side. Thus the carriage is actually supported by the upper surfaces of the racks due to the overhanging arrangements of the sliding bearing blocks with the drive being affected through the pinions 84 which engage the rack surface on the lower side thereof. The gauge carriage may also have a suitable accumulator 98 for the air or hydraulic system and a structure beam or tube 100 may interconnect the sides. It will be noted in FIG. 7 that the carriage, in effect, hangs below one of the openings 42 so that the caliper clamps may extend up through the slot with the lower jaws 46 generally at the upper surface of the table and the upper jaw 48 may rise and lower in operation. In FIG. 3 a stack is shown in phantom ahead of the caliper clamp with a portion of the table also indicated to demonstrate the relationship.

Each of the saw units 14 and 20 may be of the type disclosed in my prior U.S. Pat. No. 3,662,798, in which a saw frame supported on rails extending laterally across the axis with the saw unit mounted for sliding movement across the rails, the saw blade being rotated and in a panel engaging position during its operative stroke and, at the completion of a cross cut, the saw may be moved into inoperative position, either above or below the gauge table during its return stroke. The saw units may also include a load sensing device on the electric motor operating the saw which senses load and as soon as the saw completes its cut, as indicated by a load going off of the saw motor, the mechanism may be automatically actuated to either raise or lower the saw out of its operationg position and, at the same time, the drive train may be reversed to immediately start the return stroke without regard to the particular width of the material being cut, where the stack width is less than the maximum for the machine.

Figure 8:
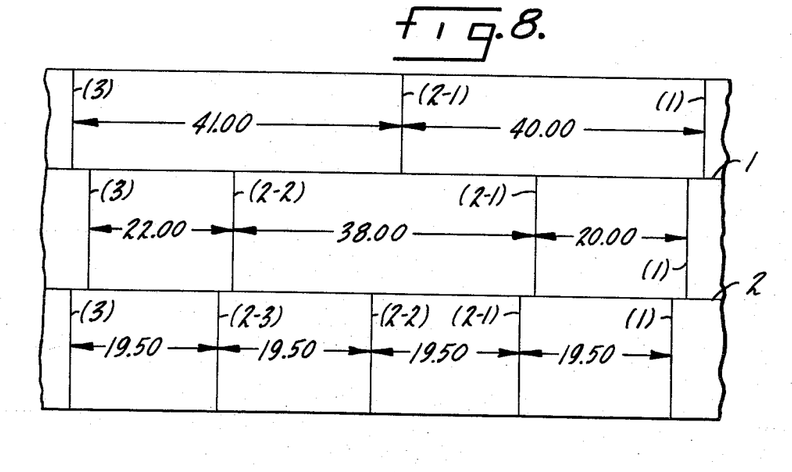
FIG. 8 is a diagrammatic of a panel pattern.

The use, operation and function of the invention are as follows:

In FIG. 8, I have shown a typical cut pattern for a board of any given size. Certain programmed moves are indicated on FIG. 8 and it should be understood that these are merely examples and quite naturally will vary from one pattern to another. The dimensions and distances shown should be taken as merely illustrative, but setting forth a set of examples dimensions at this stage will simplify the explanation.

Figure 9:
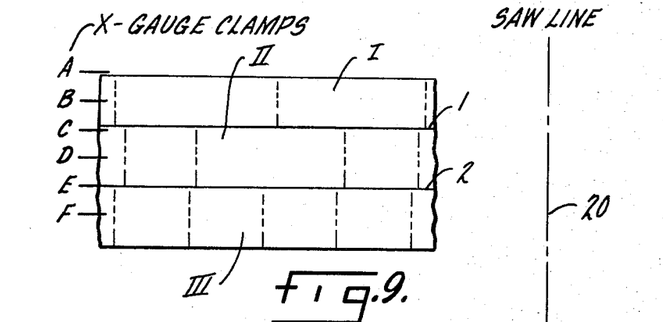
FIGS. 9–17 are diagrammatics of various panel movements of positions.

In FIG. 9, a particular number of boards, say seven, have been stacked and cut laterally while moving on the Y axis along certain cut lines, in this case two, numbered 1 and 2 in FIG. 9, in addition to the forward and rearward trim cuts. This gives three strip stacks I, II and III. The stacked strips move on the transfer unit 16, then along the X axis to the X axis gauge clamps which, in the example given above, are six. In FIG. 9, the strip stacks may be assumed to be moving from left to right and the six clamps are designated A through F along the rear edge thereof. The saw line is diagrammatically indicated ahead at 20 with certain cut lines to be taken at saw line 20, shown on the stack strip in broken lines. Clamps A through F are electronically controlled by computer 26 in the control housing or platform and at the start of an X axis cycle, all of the clamps not programmed to be inoperative or off will open and all of the clamps move forward to a gripping position to grip the rear marginal edge of the stack strips and then close. In the particular pattern shown in FIG. 9, the A clamp is beyond the stack strips so it may be inoperative and programmed off. B will be operative, C and D will be operative and will be electronically tied together, E is lined up with the Y axis cut line 2 and therefore will be inoperative and F will be operative.

Figure 10:
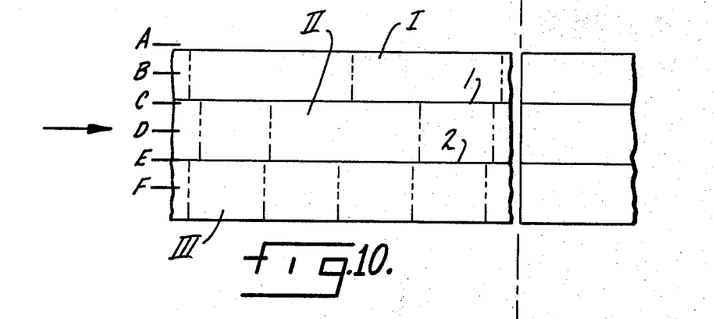
Figure 11:
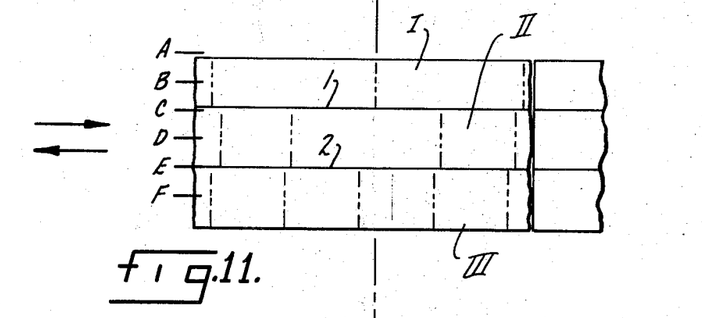

Upon closure, all clamps move forward to bring the leading edges of the three strip stacks to a position just short of the saw line, then all clamps ramp down to a stop which is the position shown in FIG. 10 where the forward edge of each strip stack is just short of the saw line and spaced a little from the rear cut edge of a previous group of panels. After coming to a stop, movement is again resumed and the feed of a certain distance takes place which will cause the previously cut panels in the first group, the rear edge of which can be seen in FIG. 10, to be contacted and pushed by the forward edge of the second group. This causes a complete discharge or ejection of the previously cut parts. The pause at the saw line is to reduce the impact upon contact between the parts and the second group will be picking up the cut parts from the first group when they are on their acceleration. The previous parts may be pushed off the end of the machine until the gauge clamps come to a stop at any selected point, such as indicated in FIG. 11. Then they reverse feed all the way back to the starting position, such as in FIG. 12.

Even though certain of the gauge clamps are not in use such as clamps A and E, but rather are programmed off, they are moved through the steps or dry cycled, the object being so that the wear pattern on their drive parts, gears, pinions, slides, etc., will be the same as all the other clamps. On different patterns, they will, of course, be used and it is desirable that all clamps experience the same amount of wear so that their operation in the future will be uniform.

Figure 12:
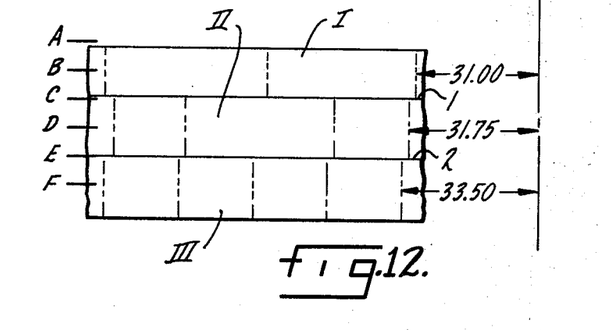

Upon arriving back at the starting position, such as shown in FIG. 12, a small increment of minus or rearward movement is added, for example one inch to all clamps. Thereafter, as the clamps are moved forward again through the various feeding steps to the saw line to cut the panels, the same increment is added to a forward or plus movement, in this case one inch. The object of this is to offset any backlash in the machine members on the subsequent forward moves.

The clamps now move forward a certain amount to effect the forward trim at the saw line. Strip I is fed a distance of 31 inches, strip II 31.75 inches, and strip III 33.50 inches. When they have been fed these respective distances they come to a stop. They are all then fed together the one additional inch backlash compensation. Since the main portion of their feeding steps vary somewhat in distance, all strips come to a stop and then move together, the one inch backlash compensation. The object of moving the last small increment together, the backlash compensation, is so that one strip won't stop at the saw line ahead of the strip next to it. Otherwise, the still moving strip might push or nudge an already stopped strip forward a little. Any variation in accurate stopping caused by a still moving strip frictionally nudging an already stopped strip stack will be taken care of when they all move together the small backlash compensation at the end of a feeding step.

Figure 13:
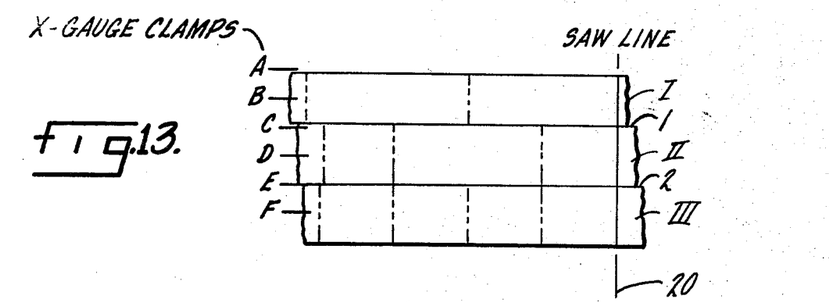

For this step the movements of the various clamps are as follows:

The A clamp is de-energized or programmed off, meaning that it will not open but it will be electronically tied to the B clamp so that it moves with it. The B clamp grips the rear marginal edge of stack strip I and moves 31 inches, the C and D clamps both grip the rear marginal edge of stack strip II and move together 31.75 inches, the E clamp is de-energized and programmed off, meaning that it will not open, but it is electronically tied to clamp F. The clamp F grips the rear marginal edge of strip stack III and moves 33.50 inches. After all three strip stacks come to a stop, they then move the one inch backlash compensation together, which brings cut lines (1) on all three strip stacks to the saw line and in alignment with each other. This is the FIG. 13 position. The saw then completes a cycle, meaning that it transverses the X axis and cuts along the lines (1) and returns to one side of the table. While the cut is taking place, the hold downs come down and press both ahead and behind of the saw line and may be of the type shown in a prior U.S. Pat. No. 3,662,798. The trim on the front edge of each strip stack is then discharged by being dropped down through doors in the table, not shown, to a discharge unit underneath or eject to the side while the saw is completing its return move.

Figure 14:
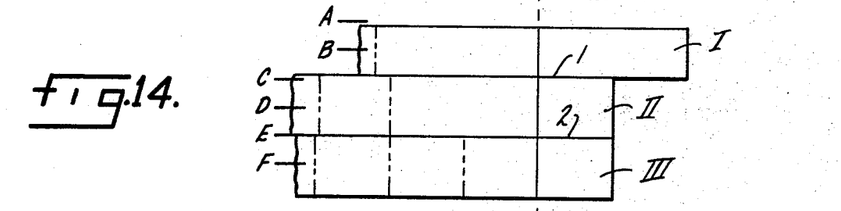

As soon as trim discharge is complete all clamps, A through F, reverse feed a short distance for the backlash compensation, in the example given above, one inch. This will space cut lines (1) one inch back from the saw line. Then all clamps, A through F, move forward their next gauging or feeding step for their respective strip stacks, in the case of strip stack I forty inches, II thirty-eight inches, and III 19.50 inches. An additional one-quarter of an inch (0.25) is added to each move to compensate for the material loss due to the saw kerf. The moves of the individual clamps will be as follows. Clamp A moves with B. Clamp B moves forward 40.25 inches. Clamps C and D move 20.25 inches. Clamp E moves with F and clamp F moves 19.75 inches. After all clamps come to a stop they then move, in unison, the short backlash compensation, for example one inch, which is the FIG. 14 position. This brings the cut lines (2–1) of the FIG. 8 pattern to the saw line. The hold downs then descend and the saw completes its cycle, after which all clamps move back to backlash compensation — 1 inch.

At this point strip stack I has one more cut to be taken which is the rear trim, strip stack II has two more cuts to be taken, and strip stack III has three more cuts to be taken. So stack I does not need to be fed and, in a sense, may remain stationary, while those clamps associated with stacks II and III take their next move. Strip stack I, however, is moved as follows. Clamp A moves with clamp B. Clamp B moves a short distance forward, say ½ inch, then rearward a somewhat greater distance, say 1½ inches, which is the amount of the one-half toward movement plus the rearward backlash compensation. Then it stops. Clamps C and D move 38.25 inches, clamp E moves with F and clamp F moves 19.75 inches, where they all stop. Then clamps C through F move their forward backlash compensation, i.e., one inch. Note that clamps A and B, which control strip stack I, do not move. The hold downs then descend with the strips in the position shown in FIG. 15 with the cut lines (2—2) of strips II and III on the saw line, and the saw completes a cut. After the saw completes a cut, strip stacks II and III reverse feed one inch, the backlash compensation. At this point, the remaining cut for both strip stacks I and II is the trim cut, whereas strip stack III has two more cuts.

For the next feed, strip stack I does not have to move, so clamps A and B are stationary. Strip stack II only has the rear trim cut to take, so it does not require a feeding step. Clamps C and D, however, move forward a short distance, say ½ inch, and then rearwardly a somewhat greater distance, say 1½ inches, which is the same two-step movement that strip stack I went through on the previous feed. Then, they stop. Clamps E and F move 19.75 and stop. Then E and F move forward the one inch backlash compensation, the hold downs descend and the saw completes its cut cycle the cut line (2–3) of the pattern on the saw line. This is the position shown in FIG. 16.

Figure 16:
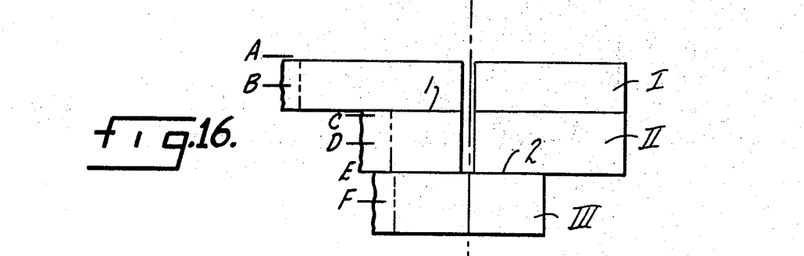

It should be noted that strip I did not move at all. Strip II only went through the two-step routine, and then stopped. Only strip III went through a full feeding cycle. As shown in FIG. 16 the rear edge of the previously cut panels on strips I and II are spaced forwardly of the saw line somewhat, whereas the forward edge of the remainder of strips I and II are spaced back somewhat. Thus, the saw in passing through will not cut the exposed, just-cut edges, which will prevent the saw from ragging or fraying these edges or surfaces, which would happen if they were kept in position. But since they are spaced from the saw line there will be full clearance when the saw comes through. The faces or surfaces are not mangled by the saw's second path.

Figure 17:
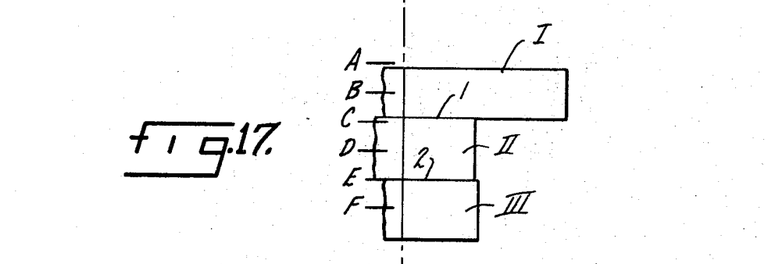

Following the saw cycle, clamps E and F reverse feed strip III the backlash compensation, i.e., one inch. Then all three strips move their last feeding step. Clamp A moves with B. B moves strip I 41.25 inches. Clamps C and D move strip II 22.25 inches. Clamp E moves with F. And Clamp F moves strip III 19.75 inches, which will bring the trim cut lines to the saw line as shown in FIG. 17. When all strips have moved these distances, then the clamps and strips all move an automatic additional backlash compensation, i.e., one inch, the forward hold down descends and the saw moves across with the cut lines (3) of all three strips on the saw line. At the same time all clamps open and start their reverse feed, which frees the rear trim. All clamps then close so that the upper jaws drop below table level during reverse feed to allow the next strip stack from the transfer unit 16 to be moved on to the gauge table 18 while the clamps are reverse feeding. The forward hold downs are still in operation. The saw completes its cycle which means that it moves out of the plane of the table, either up or down, and reverse feeds to its start position. All of this may be done with the clamps in motion to speed up the cycle. At the completion of the saw cycle, the trim may be discharged and the mechanism is ready for the next cycle.

It is advantageous to program the mechanism so that the strip stack with the most cuts to be taken is on the inside, which is strip stack III. As shown and explained in my prior U.S. Pat. No. 3,662,798, there is a fence or uprise along this edge, as at 102 in FIGS. 1 and 4. All of the strip stacks on the X axis are biased laterally against this fence by a so-called robot 104 for accurate registry and I have found that if the strip stack with the most cuts to be taken is against the fence, you experience less tendency of the stacks to skew. Stated the other way around, if the strip stack with the most cuts to be taken is away from the fence, to be handled, for example, by the A and B clamp, skewing will result. I prefer and recommend that strip stack with the most cuts to be taken by against the fence, the one with the least cuts to be taken to be farthest from the fence and the strip stack be arranged in descending order according to the number of cuts to be taken.

While I have indicated in the ejection procedure, as in FIGS. 9–12, that a second group of stack strips are moved all the way through the saw line and then reverse fed, it should be understood that this procedure may be used with single strip stacks, a first stack being cut into panels and then ejected by feeding a second strip stack all the way through the saw line and then reverse feeding.

Also, I have indicated in FIGS. 11 and 12 that the second group of strip stacks, after ejecting the first group, are reverse fed all the way back to the FIG. 9 position. But this is not absolutely necessary. For the FIG. 11 position, which represents full ejection of the first group, the second group could be reverse fed just far enough so that the cut lines (1) clear the saw line — for example, the amount of the backlash compensation, 1 inch — to approximately the FIG. 10 position and then forward feeding could resume. This could well speed up the cycle by saving the lost motion of going all the way back to the start position of FIG. 9 and then feeding up to the saw line again.

The X axis saw starts on one side, moves across making a cut. When a cut is complete its crosstravel strop and the saw moves out of the plane of the strip stacks, either up or down, and the reverse feeds back to its starting point. The movement and cutting reaction of the saw through the strip stack will cause a side thrust on the panels and I prefer that the starting position of the saw be on the side opposite the fence 98 so that the cutting thrust of the saw will be taken by the fence. Where the two-step is used, such as in FIGS. 15 and 16, to create a gap in one or more of the strip stacks, I prefer that the saw start from the side with strip stacks still needing a cut since saw movement through the gap will be wasted. For example, in FIG. 16, if the saw starts from the top, its movement through the gaps in strips I and II will be wasted. But it will have to go all the way across to cut the strip stack III. So the saw should start at the bottom and immediately contact III. As soon as the saw enters the gap in stack II, the load-sensing device will cause it to drop down or up and it will immediately be returned to its starting point. In this case the fence should be at the top so that the thrust of the saw reaction is taken on the fence. In sum, the strip stack with the least cuts to be taken should be against the fence, while the strip stack with the most cuts to be taken should be on the side next to the saw.

Figure 15:
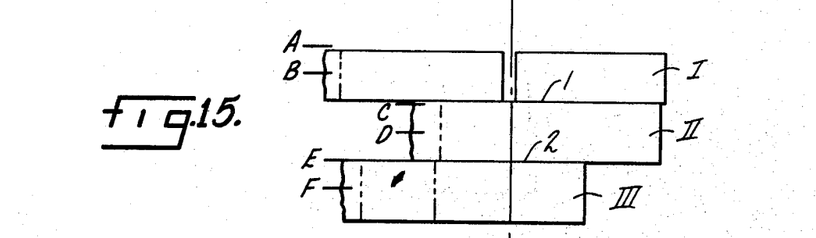

Also, the two-step routine, as in FIGS. 15 and 16, may be used for purposes other than saw clearance. For example, it is often desirable to mark the cut panels so that in subsequent handling they may be quickly and easily identified. They cannot be marked along the sides nor the forward edge but, as noted in FIGS. 15 and 16, the rear edges are exposed and either before or after a saw pass, a printing mechanism might be raised or lowered to print an indication of panel size, or any other suitable designation along the rear edge. For this purpose the twostep might be applied to strip III after FIG. 16 so that a full gap will exist to allow marking of the last strip before the final feeding step of FIG. 17.

While I have shown and described a preferred form of my invention and suggested numerous modifications and variations, it should be understood that numerous additional modifications and changes may be made without departing from the invention's fundamental theme.

The embodiments of the invention in which an exclusive property or privilege is claimed are defined as follows:

1. A method of differentially feeding individual stacks of a plurality of elongated panel strips along a defined path to a saw line at a crosscut station to form various sized panels, including the steps of positioning a plurality of the strip stacks side-by-side in the defined path, feeding the strip stacks in predetermined steps to the saw line, and varying the amount of feed of at least one strip stack relative to the other so that panels of different sizes will be cut from the various strip stacks.

2. The method of claim 1 further characterized by and including the step of grasping the rear marginal edges of the stacks and affecting feeding of the various stacks from the grasped rear marginal edges.

3. The method of claim 1 further characterized by and including the step of causing all of the strip stacks to be cut to stop at the saw line at the same time at the end of each feeding step.

4. The method of claim 1 further characterized by and including the step of feeding those strip stacks that are not to be fed a short distance forwardly at the beginning of a feeding step for the other strip stacks and then reverse feeding them a somewhat greater distance so that during the next saw cut the rear edge of the nonfed already cut panels and the forward edge of the nonfed strip stacks will be spaced somewhat from the saw line.

5. In an apparatus for differentially feeding individual strip stacks of a plurality of elongated panel strips, a table defining an axis, means for feeding a plurality of strip stacks in side by side relation along the axis, a saw station toward one end where a saw is arranged to take lateral cuts across the axis, means for feeding the strip stacks predetermined steps to the saw line and means for varying the amount of feed of at least one strip stack relative to the others so that panels of different sizes will be cut from the various strip stacks at the saw line.

6. A method of differentially feeding and cutting a plurality of strip stacks to form variously sized panels, including the step of positioning all of the strip stacks in side by side relation on a plane surface for movement in a defined direction to a crosscutting station, providing an upright along an edge of the support extending in the defined direction, biasing all strip stacks from time to time laterally against the upright, and positioning the strip stack that is to receive the most crosscut next to the upright.

7. The method of claim 6 further characterized by and including the step of arranging the strip stacks laterally from the upright in descending order according to the number of crosscuts to be taken in each.

8. A method of feeding and cutting a plurality of elongated strip stacks along a defined path to a saw line to form panels, including the steps of positioning a first group of strip stacks side by side in the defined path, feeding the strip stacks in predetermined steps to the saw line and taking crosscuts to form the strip stacks into panels, positioning a second group of strip stacks side by side in the defined path, and feeding all of the strip stacks in the second group to and through the saw line without cutting to fully eject the first group from the saw line area.

9. The method of claim 8 further characterized by and including the step of slowing the feeding of the second group just prior to contact with the rear marginal edge of the first group so that the second group will not be traveling at full feeding speed when contact is made.

10. The method of claim 9 further characterized by and including the step of resuming full feeding speed of the second group thereafter so that the second group will be accelerating when contact is made.

11. The method of claim 8 further characterized by and including the steps of stopping the feeding of the second group just prior to contact with the rear marginal edge of the first group, and resuming feeding of the second group thereafter so that the second group will be accelerating when contact is made.

12. The method of claim 8 further characterized by and including the step of varying the amount of feed of at least one strip stack relative to the other so that panels of different sizes will be cut from the various strip stacks in the group.

13. A method of forming accurately dimensioned panels from sheets of material, including the steps of positioning a number of sheets in a stack, feeding the stack along a first axis in predetermined steps to a first crosscutting station, cutting the stack laterally at the first cutting station after each step into a plurality of side by side laterally disposed strip stacks, thereafter feeding the side by side strip stacks laterally along a second axis to a second crosscutting station, cutting the strip stacks at the second cutting station in a direction lateral to the second axis, and varying the amount of feed of at least one strip stack relative to the other so that panels of different sizes will be cut from the various strip stacks at the second cutting station.

14. A method of differentially feeding individual stacks of a plurality of elongated panel strips along a defined path to a saw line at a crosscut station to form various sized panels, including the steps of positioning a plurality of strip stacks side by side in the defined path, providing a plurality of individual feeding units spaced laterally across the defined path, engaging the strip stacks with the feeding units to affect feeding thereof, rendering inoperative those feeding units that are either aligned with the longitudinal edges of the strip stack or spaced so as not to engage any of the stacks, affecting feeding of the strip stacks by the feeding unit that are operative, and dry cycling the inoperative units at the same time so that the wear pattern on all feeding units will be the same.

15. A method of differentially feeding individual stacks of a plurality of elongated panel strips along a defined path to a saw line at a crosscut station to form various sized panels, including the steps of positioning a plurality of the strip stacks side by side with their long dimension in the defined path, feeding the strip stacks in predetermined steps to the saw line, varying the amount of feed of at least one strip stack relative to the others so that panels of different sizes will be cut from the various strip stacks, and causing all strip stacks that are to be cut to arrive and stop at the saw line at the same time at the end of each feeding step.

16. The method of claim 15 further characterized by and including the step of stopping all of the stacks being fed a certain distance short of the saw line until all strip stacks being fed have been so stopped, and then feeding all strip stacks together to be cut the certain distance so that they arrive at the saw line at the same time.

17. A method of differentially feeding individual stacks of a plurality of elongated panel strips along a defined path to a saw line at a crosscut station to form various sized panels, including the steps of positioning a plurality of the strip stacks side by side with their long dimension in the defined path, feeding the strip stacks in predetermined steps to the saw line, varying the amount of feed of at least one strip stack relative to the other so that panels of different sizes will be cut from the various strip stacks, reverse feeding the said one strip stack a small amount after a cut, and feeding the said one strip stack the distance of the predetermined step plus an amount equal to the small reverse feed so that any backlash in the machine members will be offset.

18. A method of differentially feeding individual stacks of a plurality of elongated panel strips along a defined path to a saw line at a crosscut station to form various sized panels, including the steps of positioning a plurality of the strip stacks side by side with their long dimension in the defined path, feeding the strip stacks in predetermined steps to the saw line, varying the amount of feed of some of the strip stacks relative to the others so that panels of different sizes will be cut from the various strip stacks, reverse feeding the strip stacks a small amount after a cut, and feeding the strip stacks the distance of their individual predetermined steps and, at the end thereof, feeding the strip stacks an additional amount equal to the small reverse feed so that any backlash in the machine members will be offset.

19. A method of differentially feeding individual stacks of a plurality of elongated panel strips along a defined path to a saw line at a crosscut station to form various sized panels, including the steps of positioning a plurality of the strip stacks side by side with their long dimension in the defined path, feeding the strip stacks in predetermined steps to the saw line, varying the amount of feed of at least one strip stack relative to the others so that panels of different sizes will be cut from the various strip stacks, feeding a selected strip stack forward a short distance after a cutting step and then reverse feeding it a somewhat greater distance so that the rear edge of its previously cut panel and the forward edge of its remaining strip stack will be spaced somewhat from the saw line, and feeding the other strip stacks through the next feeding step while holding the said one strip stack stationary.

20. A method of feeding a plurality of elongated panel strip stacks along a defined path to a saw line at a crosscut station to form panel stacks, including the steps of positioning at least one strip stack with its long dimension in the defined path, feeding the strip stack in predetermined steps to the saw line and taking cuts between steps, feeding the strip stack forward a short distance after a cut and then reverse feeding it after a cut so that the rear edge of the previously cut panel will be spaced somewhat from the forward edge of the remaining strip stack so that a gap is created of a certain width at the cut line.

21. A method of feeding and cutting a plurality of elongated strip stacks along a defined path to a saw line to form panels, including the steps of positioning a first group of strip stacks side by side in the defined path, feeding the strip stacks in predetermined steps to the saw line and taking cuts to form the strip stacks into panels, positioning a second group of strip stacks side by side in the defined path, feeding the second group of strip stacks to the saw line, and slowing the feeding of the second group just prior to contact with the rear marginal edge of the first group so that the second group will not be traveling at full feeding speed when contact is made.

22. The method of claim 21 further characterized by and including the step of resuming full feeding speed of the second group thereafter so that the second group will be accelerating when contact is made.

23. The method of claim 21 further characterized in that the step of slowing the feeding of the second group includes the step of stopping the feeding of the second group just prior to contact with the rear marginal edge of the first group, and resuming feeding of the second group thereafter so that the second group will be accelerating when contact is made.

24. The method of claim 21 further characterized by and including the step of feeding all of the strip stacks in the second group to and through the saw line without cutting to fully eject the first group from the saw line area, reverse feeding all of the strip stacks in the second group until they clear the saw line area and then feeding the second group of strip stacks in predetermined steps to the saw line to cut the strip stacks into various size panels.

25. A method of feeding and cutting strip stacks along a defined path to a saw line to form panels, including the steps of positioning the first strip stack in the defined path, feeding the first strip stack in predetermined steps to the saw line and taking cuts to form the strip stacks into panels, positioning a second strip stack in the defined path, feeding the second strip stack to and through the saw line without cutting to fully eject the first strip stack panels from the saw line area, and then reverse feed the second strip stack back through the saw line so that crosscut may be taken thereon to form it into panels.

* * * * *